(12) United States Patent
Yeo et al.

(10) Patent No.: US 6,268,891 B1
(45) Date of Patent: Jul. 31, 2001

(54) VCR INTEGRATED WITH PROJECTOR

(75) Inventors: Myung-Keun Yeo; Nam-Su Lee; Young-Taik Lim, all of Kyungki-do; Dae-Sul Sim, Incheon-si, all of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 08/406,301

(22) Filed: Mar. 17, 1995

(30) Foreign Application Priority Data

Mar. 19, 1994 (KR) .................................................. 94-5541

(51) Int. Cl.[7] .............................. H04N 5/64; H04N 9/31; H04N 5/268
(52) U.S. Cl. ........................................... 348/744; 348/705
(58) Field of Search ..................................... 348/705, 706, 348/554, 759, 761, 341, 333, 344, 744; 345/87, 88; 386/46, 1; H04N 9/31, 5/74, 5/268

(56) References Cited

U.S. PATENT DOCUMENTS

| | | | |
|---|---|---|---|
| 4,663,674 | 5/1987 | Osawa . | |
| 4,942,488 | 7/1990 | Osawa . | |
| 5,136,397 | * 8/1992 | Miyashita | 348/748 |
| 5,191,450 | * 3/1993 | Yajima et al. | 345/88 |
| 5,216,552 | * 6/1993 | Dunlap et al. | 348/705 |
| 5,282,243 | * 1/1994 | Murayama et al. | 345/87 |
| 5,303,294 | 4/1994 | Kimoto et al. . | |
| 5,483,285 | * 1/1996 | Lim et al. | 348/341 |

* cited by examiner

Primary Examiner—Michael Lee
(74) Attorney, Agent, or Firm—Finnegan, Henderson, Farabow, Garrett & Dunner, L.L.P.

(57) ABSTRACT

A VCR-projector assembly that permits projection of a video signals of a TV or video tape in a desired direction. The VCR-projector assembly includes a key application part including various keys, a tuner for tuning broadcasting signals received through an antenna, a VCR for recording the broadcast signals from the tuner and reproducing the recorded broadcast signals or other recorded signals, e.g., already recorded on video tape, a projector for processing and projecting signals received from the tuner or the VCR, a switching device interconnecting the tuner, the VCR, and the projector for selecting a projection function, a zoom processing device for responding to application of a projection zoom key of the key application part, a projection controller for controlling processing of the projector in response to a user's selection of projection direction, and a mirror assembly for reflecting images processed under the control of the projection controller onto a screen in the projection direction selected by the user.

6 Claims, 6 Drawing Sheets

VCR INTEGRATED WITH PROJECTOR

BACKGROUND OF THE INVENTION

This invention relates to a VCR-projector assembly (hereinafter called "VCR"), more particularly to a VCR-projector assembly that permits projection in a desired direction.

In general, a projector is a device that can display video signals received from a TV, a VCR, or an external imaging device on a screen.

Further, the projector, when processing video signals from a VCR or a TV, displays them on an LCD panel in the projector, and displays them on a screen.

However, as shown in FIG. 1, in order to project the video signals from a VCR or a TV on a screen, the projector and the VCR, or the projector and the TV on each occasion must be manually connected using an appropriate jack.

Typically, there is no separate device for changing direction of projection. Thus, the projector itself is moved manually.

As is also known, the zoom mechanism of the projector should be adjusted again to provide a clear picture after moving the projector. Again, this adjustment must be done manually.

SUMMARY OF THE INVENTION

An object of this invention is to solve the foregoing problems and, more specifically, to provide a VCR-projector assembly that facilitates projection of recorded signals reproduced in a VCR or broadcast signals from a tuner.

Another object of this invention is to provide a VCR-projector assembly that can change direction of projection easily using mirrors without moving the projector itself.

Another object of this invention is to provide a VCR-projector assembly that allows zooming by a VCR remote controller following the change of projection direction.

These and other objects and features of this invention can be achieved by a VCR-projector assembly having a key application part including various keys, a tuner for tuning broadcast signals received through an antenna, and an included VCR for recording the broadcast signals from the tuner and reproducing the recorded broadcast signals or other recorded signals. The assembly further includes projector means for processing and projecting the broadcast signals from the tuner, or the reproduced recorded broadcast signals or other recorded signals from the VCR, and a switch assembly connected to the tuner, to the included VCR, and to the projector. The assembly still further includes zoom processing responding to application of a projection zoom key of the key application part.

These and other objects and features of this invention can be achieved by a VCR-projector assembly having a key application part including various keys, a tuner for tuning broadcast signals received through an antenna, and an included VCR for recording the broadcast signals from the tuner and reproducing the recorded broadcast signals or other recorded signals. The assembly further includes a projector for processing and projecting the broadcast signals from the tuner, or the reproduced recorded broadcast signals or other recorded signals from the included VCR, a switch assembly connected to the tuner, to the included VCR, and to the projector for selecting projection function. The assembly further includes a zoom assembly for responding to application of a projection zoom key of the key application part, a VCR power source for supplying power to the included VCR, and a projector power source part for supplying power to the projector.

These and other objects and features of this invention further can be achieved by a VCR-projector assembly having a key application part including various keys, a tuner for tuning broadcast signals received through an antenna, an included VCR for recording the broadcast signals from the tuner and reproducing the recorded broadcast signals or other recorded signals, a projector for processing and projecting the broadcast signals from the tuner, or the reproduced recorded broadcast signals or other recorded signals from the included VCR, and a switch assembly connected to the tuner, to the included VCR, and to the projector for selecting a projection function. The assembly further includes a zoom assembly for responding to application of a projection zoom key of the key application part, a projection controller for controlling processing and projecting of the projector in response to a user's selection of projection direction, and a mirror part for reflecting images processed under the control of the projection controller onto a screen in a projection direction selected by a user.

Additional features and advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate preferred embodiments of the apparatus and method according to the invention and, together with the description, serve to explain the principles of the invention.

DESCRIPTION OF THE PREFERRED EMBODIMENTS

Reference will now be made in detail to preferred embodiments of the invention, examples of which are illustrated in the accompanying drawings. Wherever possible, the same reference numbers will be used throughout the drawings to refer to the same or like parts.

First Embodiment

Figure 1:
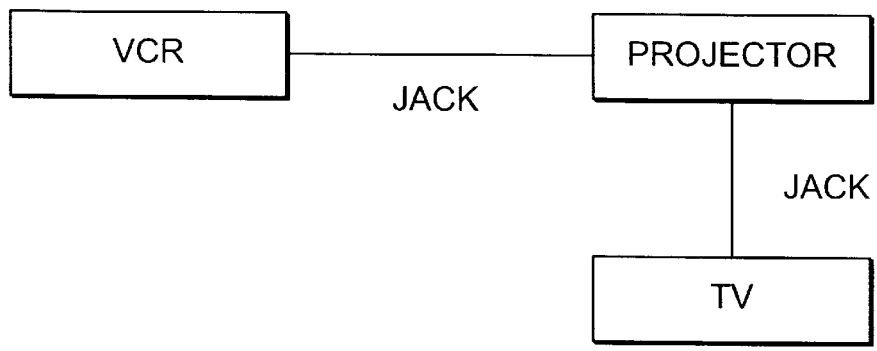
FIG. 1 shows conventional connections of a projector to devices such as a VCR and a TV.
Figure 2:
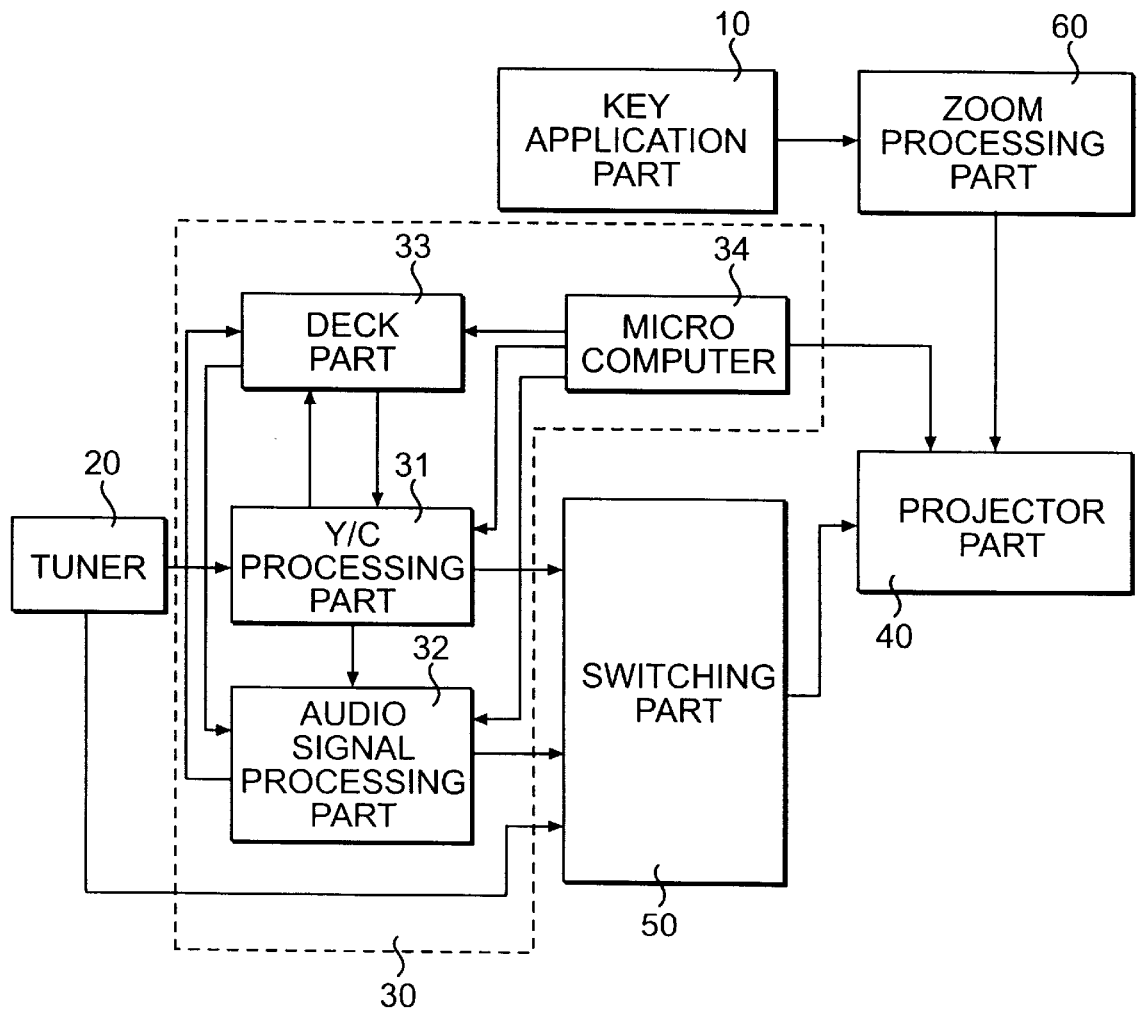
FIG. 2 is a block diagram of a VCR-projector assembly in accordance with a first embodiment of this invention.

FIG. 2 is a block diagram of a VCR-projector assembly in accordance with one embodiment of this invention, including a key application part 10 including various keys, a tuner 20 for tuning broadcast signals received through an antenna (not shown), an included VCR 30 for recording the broadcasting signals from the tuner 20 and reproducing those or other signals recorded on video tape, a projection part 40 for processing and projection of received or reproduced signals, a switch assembly 50 provided to be connected to the tuner 20, to the VCR part 30, and to the projection part 40 for selection of a projection function, and a zoom assembly 60 for responding to application of a projection zoom key of the key application part 10.

The key application part 10 includes a PRO/VCR key for selection of a projection function or a VCR function, a projection display key for recording and projection of signals and zoom up/down keys, and other keys such as a recording key, play (reproduction) key etc., and is a key matrix provided on a remote controller or the VCR-projector assembly itself.

The VCR part 30 includes a luminescence and color (hereinafter called Y/C) processing part 31 and an audio signal processing part 32 for processing video and audio signals received from the tuner 20 respectively, a deck part 33 for recording and reproduction of video signals, and a microcomputer 34 for controlling various parts 31 to 33.

The projection part 40, of which the system detail will be explained later, for example, with respect to FIG. 6, includes an LCD processing part 41 for processing the input video signals to be displayable on an LCD panel 44d, includes an interface part 42b and an operation part (display controller) 42a for supplying output signals of the LCD signal processing part 41 to the LCD panel 44d, thereby to cause the LCD panel 44d to display the signals as a video image, and an LCD synchronization control part 43 for providing the operation part 42a with a plurality of vertical and horizontal synchronization signals to match the horizontal and the vertical synchronization of the video signals.

Figure 3:
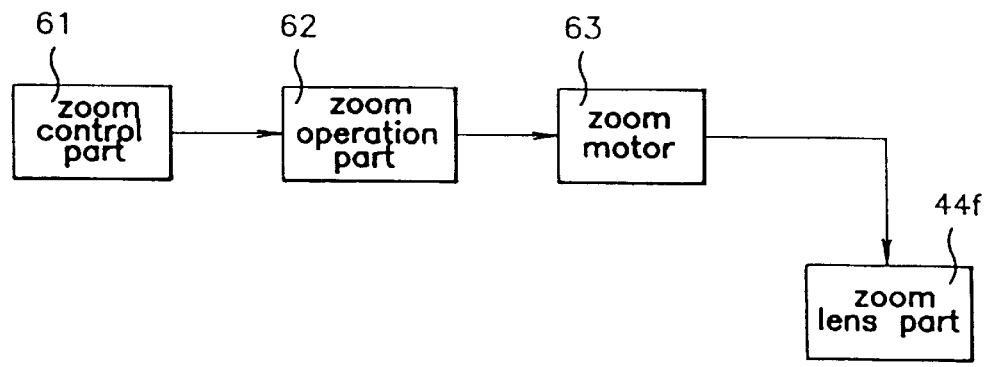
FIG. 3 is a block diagram of the zoom processing part in accordance with the first embodiment of this invention.

As shown in FIG. 3, the zoom processing part 60 includes a zoom control part 61 for generating a zoom control signal in response to and recognition of operation of a projection zoom key in the key application part 10, a zoom operation part 62 operated in response to the zoom control signal received from the zoom control part 61, and a zoom motor 63 operated by the zoom operation part 62 for driving the zoom lens part 44f to be explained later.

Although not shown, the switching part 50 is connected to a left speaker L and a right speaker R for audio outputs.

Operation of the VCR-projector assembly in accordance with one embodiment of this invention having the foregoing system now will be explained with reference to FIGS. 2 and 3.

First, when a user selects a projection function using the PRO/VCR key of the key application part 10, the switching part 50 selects the projection function under the control of the microcomputer 34.

Then, TV video signals from the tuner 20 are applied to the projection part 40 through the switching part 50, and displayed on a screen upon operation of the LCD panel 44d of the projection part 49 under the control of the microcomputer 34.

Speakers (not shown) are connected to the switching part 50 for output audio signals. Details of the operation of the projection part 40 will be explained later.

Meanwhile, upon application of the recording key after selection of VCR function with the PRO/VCR key of the key application part 10 when a user intends to record with a VCR, the video signals from the tuner 20, including video and audio signals processed through the Y/C processing part 31 and the audio signal processing part 32, are recorded on tape through the deck part 33.

When a user applies the projection display key after selection of the VCR key using the PRO/VCR key and application of recording key, the video signals from the tuner 20 are, while being recorded, applied to the projection part 40 through the switching part 50, and displayed on the screen.

The speakers output audio signals, as image signals are projected.

Upon application of the projection display key after application of a play key on the VCR in case a user intends to project video signals recorded in the VCR, the video signals reproduced through the deck part 33 are processed through the Y/C processing part 31, applied to the projection part 40 through the switching part 50, and displayed on the screen.

Meanwhile, in case the focus of the projection should be readjusted due to movement of the VCR assembly integrated with a projector in accordance with this invention, the focus is adjusted using the zoom up/down key of the key application part 10.

That is, upon application of zoom up/down key on the key application part 10, the zoom control part 61 shown in FIG. 3, recognizes it, and operates the zoom operation part 62 to correspond to the zoom up or the zoom down application.

Thereby, the zoom operation part 62 adjusts the focus by driving the zoom motor 63 and the lens of the zoom lens part 44f. The zoom function is to be explained together with the explanation on projection direction change, as such a zoom function is carried out in case projection direction is changed or the system is moved.

Second Embodiment

A second embodiment of this invention is a VCR-projector assembly having the power supply of the VCR part separated from the power supply of the projection part.

The VCR-projector assembly in accordance with the second embodiment of this invention supplies power to the VCR part only upon selection of VCR function, and to the projection part only upon selection of projection function. The same reference numbers will be used for the parts identical with the first embodiment in explaining the second embodiment.

Figure 4:
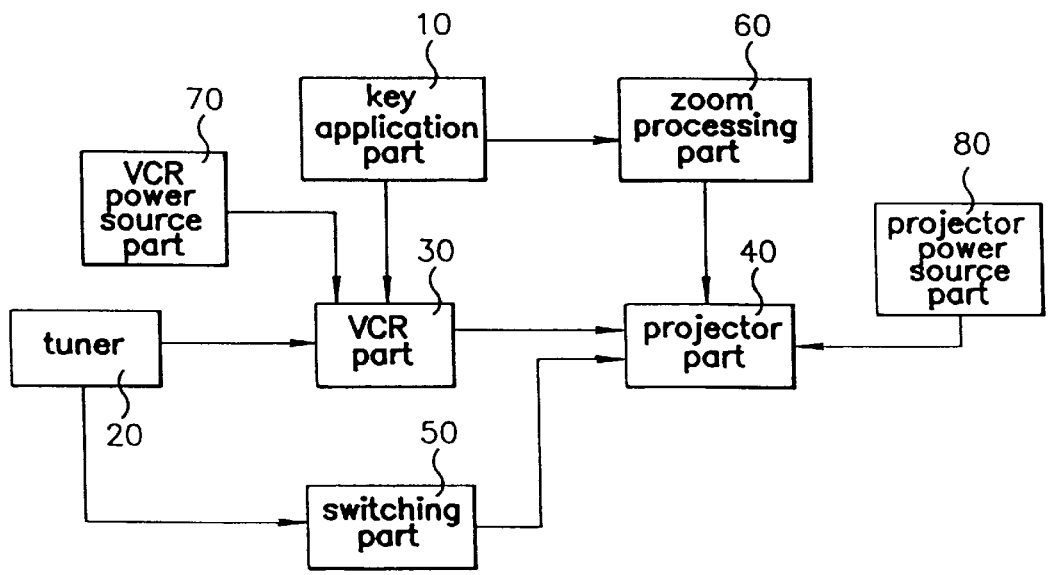
FIG. 4 is a block diagram of a VCR-projector assembly in accordance with a second embodiment of this invention.

Shown in FIG. 4 is a block diagram of the VCR-projector assembly in accordance with the second embodiment of this invention, including a key application part 10 including various keys, a tuner 20 for tuning broadcast signals received through an antenna (not shown), a VCR part 30 for recording the broadcast signals from the tuner 20 and reproducing signals recorded on video tape, a projection part 40 for processing and projection of received video signals, a switching part 50 connected to the tuner 20, to the VCR part 30, and to the projection part 40 for selection of a projection function, and a zoom processing part 60 for processing a zoom signal received from a projection zoom key of the key application part 10, a VCR power source part 70 for supplying power to the VCR part 30, and a projection power source part 80 for supplying power to the projection part 40.

The second embodiment of this invention having the foregoing system is provided to explain the state of power supply to the VCR part 30 and the projection part 40 in performing the VCR function and the projection function, which are otherwise as explained for the first embodiment.

Power is supplied, advantageously, to the VCR part 30 and projection part 40 separately, as the power required by the above parts are different from each other. This separation of power supply is desirable for reducing power consumption, but not essential, as may be appreciated from the above-described first embodiment.

In the second embodiment of this invention, there will be described the power supply while omitting the explanation on the video and audio processing and the zoom function as they are identical with those of the first embodiment.

First, in case a user selects the projection function using the PRO/VCR key of the key application part 10, since the TV video signals from the tuner 20 are projected through the projection part 40, power is supplied to the projection part 40, but not to the VCR part 30.

If the user applies the recording key after selection of the VCR function with the PRO/VCR key, since the video and the audio signals from the tuner 20 are processed through the Y/C processing part 31 and the audio processing part 32 and recorded at the deck part 33, power is supplied to the VCR part 30 only, but not to the projection part 40.

Upon application of the projection display key after selection of VCR function with the PRO/VCR key and application of the recording key, the video signals from the tuner 20 are applied to the projection part 40 through the switching part 50 and displayed on the screen, while being recorded on tape.

Therefore, in this case, power is supplied to the VCR part 30 as well as the projection part 40.

Upon application of projection display key after application of VCR play key in case the user intends to project the video signals recorded in the VCR, the video signals reproduced from tape through the deck part 33 are applied to the projection part 40 and displayed on the screen.

Therefore, in this case, the power is supplied to all of the parts of the VCR part 30 and the projection part 40.

A Third Embodiment

Another embodiment of this invention, relating to projection direction change, will now be explained, referring to FIG. 5, which is a block diagram showing a system of a VCR-projector assembly in accordance with another embodiment of this invention. The same reference numbers will be used for the parts identical with previous embodiments in explaining this embodiment.

The VCR integrated with a projector in accordance with the third embodiment of this invention includes a key application part 10 for application of various keys, a tuner 20 for tuning broadcast signals received through an antenna (not shown), a VCR part 30 for recording the broadcast signals from the tuner 20 and reproducing signals recorded on video tape, a projection part 40 for processing and projection of received video signals, a switching part 50 connected to the tuner 20, to the VCR part 30, and to the projection part 40 for selection of a projection function, a zoom processing part 60 for receiving and responding to application of a projection zoom key of the key application part 10, a projection control part 90 for controlling image processing of the projection part 40 according to the user's selection of direction of projection, and a mirror part 100 for reflecting the image processed under the control of the projection control part 90 onto a screen in the projection direction selected according to the user's selection of projection direction.

Figure 5:
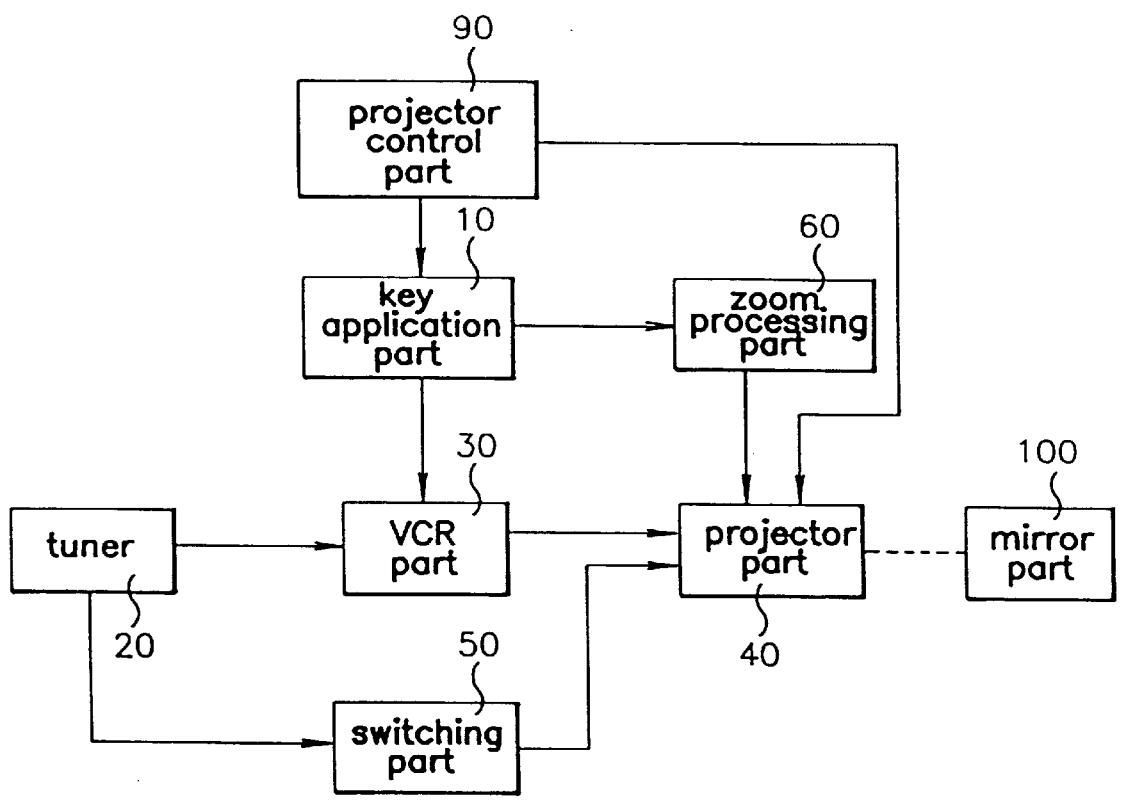
FIG. 5 is a block diagram of a VCR-projector assembly in accordance with a third embodiment of this invention.
Figure 6:
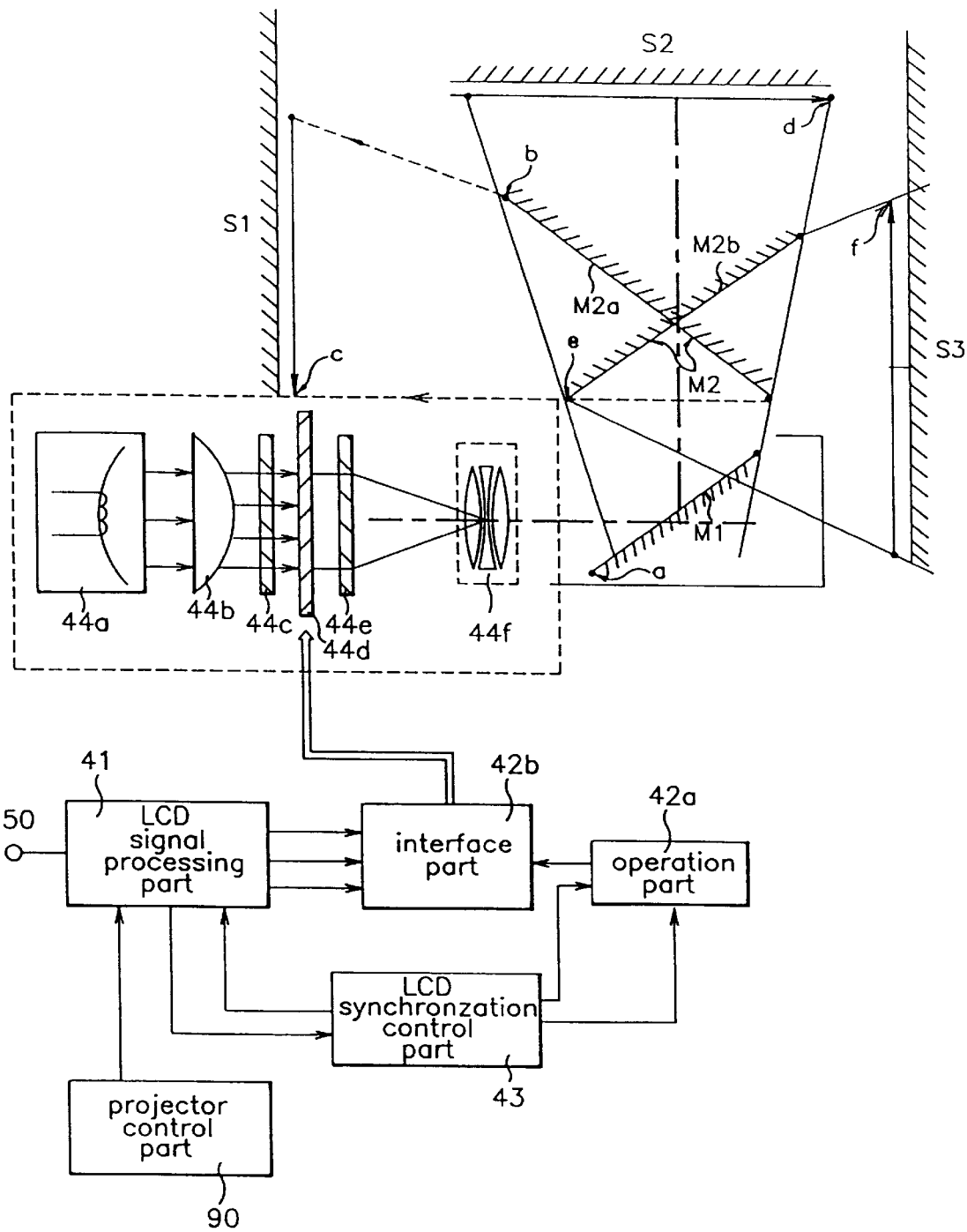
FIG. 6 is a block diagram of a projector in accordance with the embodiments of this invention.

Shown in FIG. 6 is a detailed block diagram of the projection part 40 and the mirror part 40, provided for explaining the projection direction change of FIG. 5.

The projection part 40 includes an LCD signal processing part 41 for processing the input video signals to be displayable on the LCD panel 44d of the projector, an interface part 42b and an operation part (display coordinator) 42a for supplying the signals received from the LCD signal processing part 41 to the LCD panel 44d and for operating the LCD panel 44d to display the video signals as a two-dimensional image, an LCD synchronization control part 43 for providing the operation part 42a with a plurality of horizontal and vertical synchronization signals for synchronizing the video signals in horizontal and vertical directions, a focusing lens 44b for focusing light from a light source 44a, a first polarizing plate 44c for polarizing the signals passed through the focusing lens 44b, a second polarizing plate 44e disposed to pass image pixels arranged in a matrix form and irradiated by the light passed through the first polarizing plate 44c to polarize a light image displayed on the LCD panel 44d on which the video signals received from the interface part 42b are displayed, and a zoom lens part 44f movably mounted to adjust a distance to the LCD panel 44d for focusing the light image passed through the second polarizing plate 44e.

Figure 7:
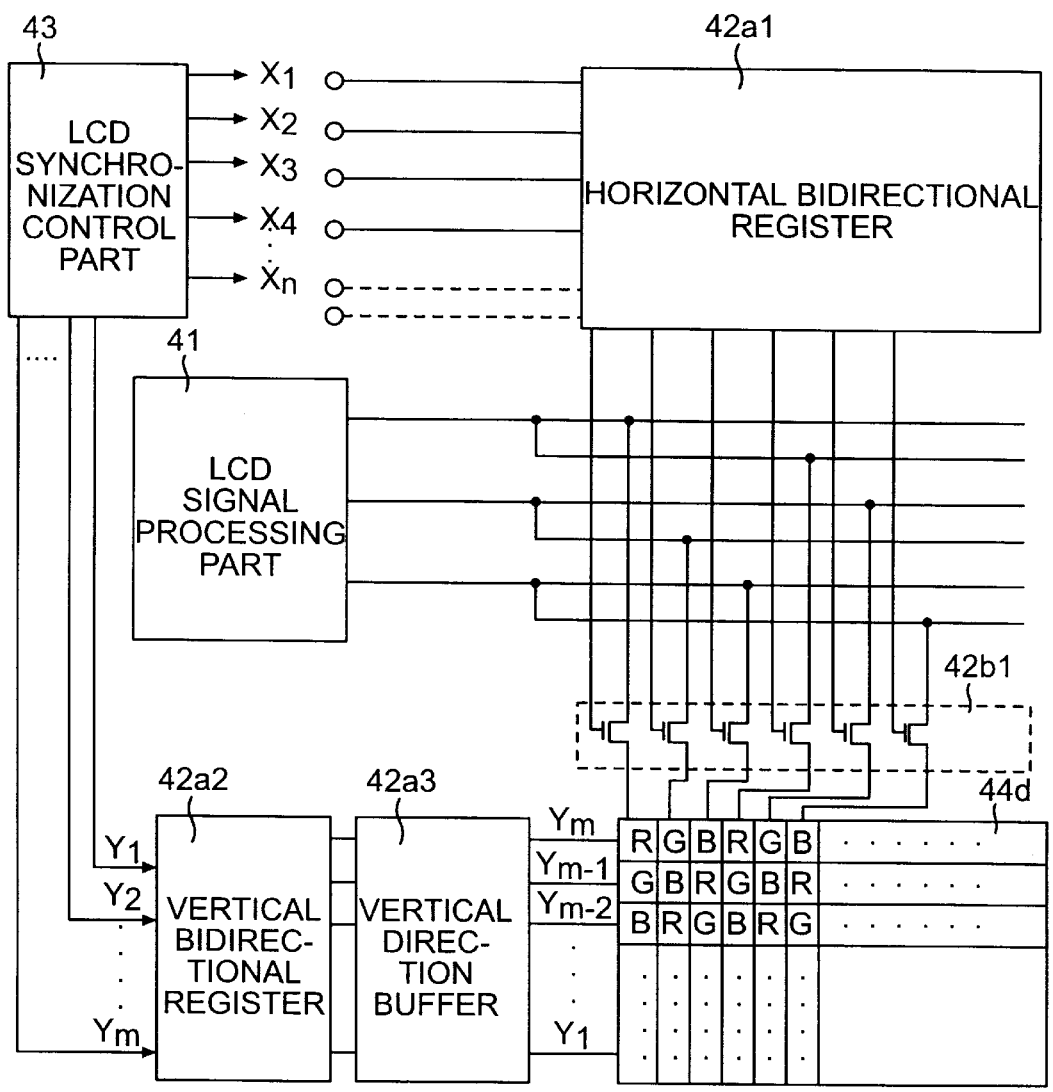
FIG. 7 is a block diagram of a display coordinator and an interface in accordance with an illustrative embodiment of this invention.

As shown in FIG. 7, the operation part (display coordinator) 42a of FIG. 6 includes a horizontal bidirectional register $42a_1$ for outputting a plurality of the horizontal synchronization signals received from the LCD synchronization control part 43 in a reverse order to the order of reception, a vertical bidirectional register $42a_2$ for outputting a plurality of the vertical synchronization signals received from the LCD synchronization control part 43 in a reverse order to the order of reception, and a vertical direction buffer $42a_3$ for buffering the plurality of the vertical synchronization signals received from the vertical bidirectional register $42a_2$ and applying the buffered signals to columns in a reverse order to the order of reception from the lowest right part to the highest left part as operating signals for operating the columns.

Further explanation of the vertical bidirectional register $42a_2$ is omitted herein, as its arrangement and operation for outputting vertical synchronization signals are exactly analogous to those of the horizontal bidirectional register $42a_1$, described above.

As shown in FIG. 7, the interface part 42b includes a sample and hold circuit $42b_1$ having a plurality of transistors with each of the sources thereof connected to the LCD signal processing part 41 at its output side, with each of the drains thereof connected to the LCD panel 44d at a respective upper pixel position in a corresponding column, and with each of the gates thereof connected to the horizontal bidirectional register $42a_1$ at a respective output position, for being operated by the horizontal synchronization signals received from the horizontal bidirectional register $42a_1$ and applying the video signals VI to V3 in forms of R, G, and B received from the LCD signal processing part 41 to the pixels at the top of pixel columns operated by the vertical synchronization signals in a reverse order to the order of reception from the farthest right side to the farthest left side, sequentially.

The mirror part 100 in FIG. 6 includes a first mirror M1 for reflecting the image projected through the zoom lens part 44f, and a second mirror M2 for reflecting the image reflected at the first mirror M1 onto the screen, and the second mirror M2 has a mirror M2a positioned at right angle to the first mirror M1 and a mirror M2b positioned in parallel with the first mirror M1.

The first and second mirrors M1 and M2 are devised to be opened on opening of a cover on the VCR-projector assembly, via its mechanism, and can be positioned to be opened in many directions depending on the user's selection of the projection direction.

Another embodiment of this invention having the foregoing system provided for explaining the image processing of the projection part 40 according to the user's selection of projection direction is to be explained hereinafter, referring to FIGS. 5 to 8.

Since the respective projection functions, as well as the respective VCR functions, of all three embodiments are identical, duplicate explanations for three embodiments are omitted herein.

The common explanation is as follows.

First, when a user intends to project an image to a screen S1, the first mirror M1 and the mirror M2a are selected, and in this case the image passed through the zoom lens part 44f is formed on the first mirror part M1 in upside down position as shown by the arrow 'a'.

The image reflected at the first mirror M1 is formed at the mirror M2a in a position 180 deg. inverted from the image on the first mirror M1 as shown by arrow 'b'.

The image reflected at the mirror M2a is formed on the screen S1 in a position 180 deg. inverted from the image on the mirror M2a as shown by arrow 'c'.

Therefore, in order to correct the inverted image on the screen S1, the image processing of the interface part 42b and the operation part 42a of the projection part 40 should be performed under the control of the projection control part 90.

Figure 8A:
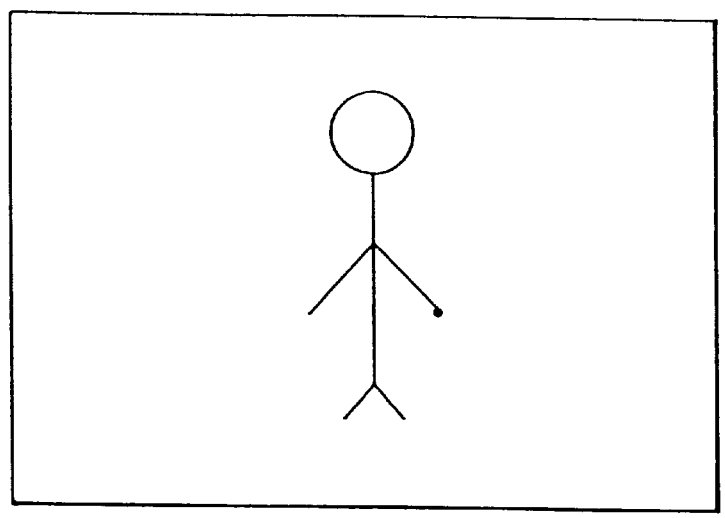
FIGS. 8a and 8b explain processing of an image in accordance with any embodiment of this invention.
Figure 8B:
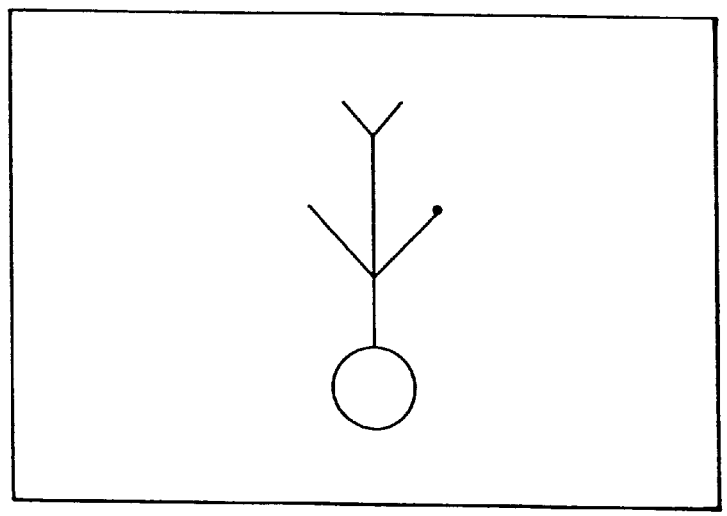

That is, as shown in FIG. 8a and 8b, since an image of FIG. 8a is shown like an image of FIG. 8b on the screen S1, it is required to make the image of FIG. 8b to be formed as shown in FIG. 8a.

To do this, it is required to make the video signals projected in a reverse order to the order of reception from the lowest right side to the highest left side, by means of the vertical and the horizontal synchronization signals.

First, each of the video signals from the LCD signal processing part 41 is applied to the sample and hold circuit 42b1 at the respective source side thereof.

The horizontal bidirectional register 42a1 of the operation part 42a outputs a number n of horizontal synchronization signals X1 to Xn received from the LCD synchronization part 43 in a reverse order to the order of reception sequentially with a certain interval between one another.

Each of these horizontal synchronization signals is applied to a respective transistor at the gate of the sample and hold circuit 42b1 as an operation signal.

The vertical bidirectional register 42a2 of the operation part 42a outputs a number m of vertical synchronization signals Y1 to Ym received from the LCD synchronization apart 43 in a reverse order to the order of reception.

Then, the vertical buffer 42a3, buffers the vertical synchronization signals Y1 to Ym received from the vertical bidirectional register 42a2, and applies each of the buffered signals to a respective column of the LCD panel 44d as an operation signal.

Accordingly, since the LCD panel 44d is operated from the lowest column to the highest column sequentially, and the transistors of the sample and holder 42b1 are turned on from the right to the left sequentially by the horizontal synchronization signals X1 to Xn, the sequential video signals V1 to V3 are applied to the LCD panel 44d from lowest part of a column to the highest part of the column in the vertical direction and from the farthest right part of the pixel array to the farthest left part of the pixel array in the horizontal direction, sequentially.

At the end, since the image displayed on the LCD panel 44d will be an image as shown in FIG. 8b, a right image will be displayed on the screen S1.

On the other hand, when it is intended to project the image on a screen S2, the first mirror M1 is selected, and in this case the image passed through the zoom lens part 44f is formed inverted on-the first mirror M1 as shown by arrow 'a'. And the image reflected at the first mirror M1 is displayed on the screen S2 as shown by arrow 'd'.

Accordingly since a right image is displayed, any correction of image as in the case of projection of the image on the screen S1 is not required.

When it is intended to project the image on a screen S3, the first mirror M1 and the mirror M2b are selected, and in this case the image reflected at the first mirror M1 is formed inverted on the mirror M2b as shown by arrow 'e'.

The image formed on the mirror M2b is reflected again onto the screen S3, forming a right image thereon at arrow 'f', requiring no further correction of the image.

In general, since a convex lens inverts an image at 180 deg., if a convex lens is added on the side of the zoom lens part 44f between the zoom lens part 44f and the first mirror M1, the image on the first mirror M1 will be formed inverted at 180 deg. from the original image shown by arrow 'a'.

Therefore, in case a convex lens is added therein, since the image displayed on the screen S1 is formed identical to the original image, no correction of image is required, but in this case, since the images on the screens S2 and S3 are formed 180 inverted from the original images, corrections of the images are required like the case of correction of image displayed on the screen S1 in case no convex lens has been added.

Concurrently, operation of zoom function by the zoom lens part 44f is as follows.

As shown in FIG. 6, the zoom lens part 44f includes convex lenses 44f1 and 44f3, and a concave lens 44f2 between the convex lenses 44f1 and 44f3.

Distances between the lenses 44f1, 44f2 and 44f3 of the zoom lens part 44f can be controlled by the zoom control part 61 according to user's zoom up and zoom down key operation.

Accordingly, the focus of the image projected on an external screen can be adjusted following the adjustment of the distances between each of the lenses 44f1, 44f2 and 44f3.

Although the embodiments of this invention have employed an LCD panel for a display element, it is evident that other elements, such as an EL (Electroluminescent) element or a CCD (Charge Coupled Device) can be employed.

Though the embodiments of this invention have employed video tape for a recording and reproduction medium of images as an example, it is evident that other recording mediums, such as a compact disc can be used for the recording and reproduction.

As has been explained, the VCR-projector assembly in accordance with this invention has following advantages.

First, since the integration of a VCR-projector assembly permits the projection of signals recorded in the VCR or broadcast signals received from a tuner built-in the VCR, this invention solves the inconvenience that a projector should be connected to a TV or a VCR and eliminates the possibility of inadvertent omission by the user.

Second, since the integration of a VCR-projector assembly permits change of projection direction with a relatively simple cover-opening motion without moving the main body of the assembly itself, this invention facilitates more convenient and simpler projection to various directions than the case of conventional projection when the assembly itself should be moved.

Third, since the VCR integrated with a projector permits simpler zooming using a remote controller or application of a key of the key matrix for each change of projection direction, the inconvenience that manual zooming should be carried out every time has been eliminated.

Although the invention has been described in conjunction with specific embodiments it is evident that many alternatives and variations will be apparent to those skilled in the art in light of the foregoing description. Accordingly the invention is intended to embrace all of the alternative and variations that fall within the spirit and scope of the appended claims.

What is claimed is:

1. A VCR-projector assembly comprising:

a key application part including various keys for providing a VCR function control signal, a projection function control signal, and a projector zoom function control signal;

a tuner for tuning broadcast signals received through an antenna;

VCR means for directly recording the broadcast signals from the tuner and reproducing the recorded broadcast signals or other recorded signals;

projector means for directly processing and projecting the broadcast signals from the tuner, or the reproduced recorded broadcast signals or other reproduced recorded signals from the VCR means;

switching means connected to the tuner, the VCR means, and the projector means for selecting a projection function, without a jack between the projector means and either of the VCR means or the tuner; and zoom processing means for responding to the projector zoom function control signal from the key application part;

projection control means for controlling processing and projecting of the projection means in response to a user's selection of projection direction; and a mirror part for reflecting images processed under the control of the projection control means onto a screen in a projection direction selected in response to a user's projection direction selection.

2. The VCR-projector assembly as claimed in claim 1, wherein the various keys of the key application part include a key for providing a VCR function control signal and a key for providing a projector zoom control signal;

wherein the switching means is connected to the tuner, the VCR means, and the projector means; and wherein the projector means includes LCD processing means for processing into displayable form the signals from the switching means;

an interface supplying output signals of the LCD signal processing means to an LCD panel and to a display coordinator for coordinating display of the signals supplied through the interface;

LCD synchronization control means for providing the display coordinator with a plurality of vertical and horizontal synchronizing signals for the supplied signals;

a light source for generating a light beam;

a focusing lens for focusing the light beam from the light source, a first polarizing plate for polarizing the light beam passed through the focusing lens, an LCD panel formed of pixels arranged in a matrix form and irradiated by the light beam passed through the first polarizing Ser. No. 08/406,301 plate, for displaying the signals received from the interface part as a light image;

a second polarizing plate for polarizing the light image displayed on the LCD panel, and a zoom lens movably mounted to adjust a distance to the LCD panel for focusing the light image passed through the second polarizing plate in response to the projector zoom signal.

3. The VCR-projector assembly as claimed in claim 2, wherein the display coordinator includes a horizontal bidirectional register for outputting a plurality of the horizontal synchronization signals received from the LCD synchronization control means in a reverse order to the order of reception, a vertical bidirectional register for outputting a plurality of the vertical synchronization signals received from the LCD synchronization control part in a reverse order to the order of reception, and a vertical direction buffer for buffering the plurality of the vertical synchronization signals received from the vertical bidirectional register and applying the buffered signals to the LCD panel at columns thereof in a reverse order to the order of reception from the lowest right part to the highest left part as signals for synchronizing the columns.

4. The VCR-projector assembly as claimed in claim 2, wherein the interface includes a sample and hold circuit having a plurality of transistors with each of the sources thereof connected to the LCD signal processing means at an output side, with each of the drains thereof connected to the LCD panel at a respective upper pixel position in a corresponding column, and with each of the gates thereof connected to the horizontal bidirectional register at an output side, for being operated by the horizontal synchronization signals received from the horizontal bidirectional register and applying the signals in forms of R, G, and B received from the LCD signal processing means to the respective pixel positions at the top of each of the corresponding pixel columns operated by the vertical synchronization signals in a reverse order to the order of reception from the most right side to the most left side, successively.

5. The VCR-projector assembly as claimed in claim 1, wherein the mirror part includes, a first mirror for reflecting the image projected through the zoom lens, and a second mirror for reflecting the image reflected at the first mirror onto the screen.

6. The VCR-projector assembly as claimed in claim 5, wherein the second mirror includes, a mirror at right angle to the first mirror and a mirror in parallel with the first mirror.

* * * * *